(12) United States Patent
Selig

(10) Patent No.: US 9,842,097 B2
(45) Date of Patent: Dec. 12, 2017

(54) BROWSER EXTENSION FOR WEB FORM FILL

(75) Inventor: Roy A. Selig, Hillsborough, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1365 days.

(21) Appl. No.: 11/980,153

(22) Filed: Oct. 30, 2007

(65) Prior Publication Data

US 2008/0184100 A1 Jul. 31, 2008

Related U.S. Application Data

(60) Provisional application No. 60/898,294, filed on Jan. 30, 2007.

(51) Int. Cl.
*G06F 17/24* (2006.01)
(52) U.S. Cl.
CPC .................................. *G06F 17/243* (2013.01)
(58) Field of Classification Search
CPC ..................................................... G06F 17/243
See application file for complete search history.

(56) References Cited

U.S. PATENT DOCUMENTS

| | | | |
|---|---|---|---|
| 6,192,380 B1 * | 2/2001 | Light et al. | 715/207 |
| 6,199,079 B1 * | 3/2001 | Gupta et al. | 715/207 |
| 6,272,493 B1 | 8/2001 | Pasquali | |
| 6,321,209 B1 | 11/2001 | Pasquali | |
| 6,434,563 B1 | 8/2002 | Pasquali et al. | |
| 6,535,882 B2 | 3/2003 | Pasquali | |
| 6,636,856 B2 | 10/2003 | Pasquali | |
| 6,651,217 B1 * | 11/2003 | Kennedy et al. | 715/224 |
| 6,658,419 B2 | 12/2003 | Pasquali | |
| 6,826,553 B1 * | 11/2004 | DaCosta et al. | |
| 6,918,066 B2 | 7/2005 | Dutta et al. | |
| 7,085,736 B2 | 8/2006 | Keezer et al. | |
| 7,089,237 B2 | 8/2006 | Turnbull et al. | |
| 7,107,264 B2 | 9/2006 | Lu | |
| 2001/0054068 A1 * | 12/2001 | Modiano | 709/203 |
| 2002/0016729 A1 * | 2/2002 | Breitenbach et al. | 705/9 |
| 2002/0149616 A1 * | 10/2002 | Gross et al. | 345/745 |
| 2002/0156846 A1 * | 10/2002 | Rawat et al. | 709/203 |
| 2002/0184043 A1 * | 12/2002 | Lavorgna et al. | 705/1 |

(Continued)

OTHER PUBLICATIONS

Wikipedia; Dashboard (software); www.en.wikipedia.com; Apr. 29, 2005; pp. 1-7.

(Continued)

*Primary Examiner* — Nathan Hillery
(74) *Attorney, Agent, or Firm* — Cooper Legal Group, LLC

(57) ABSTRACT

Methods and other embodiments associated with a web browser extension are described. One example browser extension includes a web form capture logic that identifies a web page that includes a form and an editable field on the form. The capture logic may acquire information about the field and about the form. This acquisition may include interacting with a user through a graphical user interface. The browser extension may also include a template logic to create a form-fill template based on the acquired information and a web form storage logic to store the template. The template may be referenced when a subsequent web page view involves a form-fill operation.

10 Claims, 11 Drawing Sheets

(56) References Cited

U.S. PATENT DOCUMENTS

| | | | |
|---|---|---|---|
| 2003/0043192 A1* | 3/2003 | Bouleau | 345/762 |
| 2003/0135825 A1* | 7/2003 | Gertner et al. | 715/513 |
| 2003/0225871 A1 | 12/2003 | Calinov et al. | |
| 2003/0234967 A1* | 12/2003 | Rodriguez et al. | 358/518 |
| 2004/0068693 A1* | 4/2004 | Rawat et al. | 715/507 |
| 2004/0165007 A1 | 8/2004 | Shafron | |
| 2004/0205526 A1* | 10/2004 | Borodovski et al. | 715/505 |
| 2004/0205633 A1 | 10/2004 | Martinez et al. | |
| 2004/0210828 A1* | 10/2004 | Langer | 715/501.1 |
| 2005/0039144 A1 | 2/2005 | Wada et al. | |
| 2005/0256834 A1* | 11/2005 | Millington et al. | 707/1 |
| 2006/0047646 A1* | 3/2006 | Maluf et al. | 707/4 |
| 2006/0059434 A1 | 3/2006 | Boss et al. | |
| 2006/0069617 A1 | 3/2006 | Milener et al. | |
| 2006/0143568 A1 | 6/2006 | Milener et al. | |
| 2006/0159414 A1* | 7/2006 | Wolf et al. | 386/52 |
| 2006/0179404 A1 | 8/2006 | Yolleck et al. | |
| 2006/0184578 A1 | 8/2006 | La Rotonda et al. | |
| 2006/0184997 A1 | 8/2006 | La Rotonda et al. | |
| 2006/0224397 A1* | 10/2006 | Morris et al. | 705/1 |
| 2006/0224951 A1 | 10/2006 | Burke et al. | |
| 2006/0265380 A1* | 11/2006 | Fry et al. | 707/10 |
| 2006/0282678 A1* | 12/2006 | Ali et al. | 713/185 |
| 2007/0101298 A1 | 5/2007 | Yolleck et al. | |
| 2007/0168382 A1 | 7/2007 | Tillberg et al. | |
| 2007/0288837 A1* | 12/2007 | Eaves et al. | 715/505 |
| 2007/0300172 A1* | 12/2007 | Runge et al. | 715/764 |
| 2008/0033953 A1 | 2/2008 | Vaithyanathan et al. | |
| 2008/0109741 A1* | 5/2008 | Messing et al. | 715/764 |
| 2009/0307574 A1* | 12/2009 | Padborg | 715/205 |

OTHER PUBLICATIONS

Wikipedia; Windows Sidebar; www.en.wikipedia.org; Nov. 8, 2006; pp. 1-3.

King, Brian; What is Firefox, Published on O'Reilly Network; http://www.oreillynet.com; Sep. 26, 2005; pp. 1-7.

Xulplanet; Xul Tutorial, Ch. 4.5: Content Panels (pp. 1-3) www.xulplanet.com/tutorials/xultu; Feb. 19, 2006.

Microsoft Corp.; Browse, Shop & Search Multiple Websites at Once; http://www.microsoft.com/windows/ie/ie7/tour/fre/tabs/how.html; Apr. 2007; p. 1.

Microsoft Corp.; Windows Help and How-To; Windows Vista Help: Using Quick Tabs in Internet Explorer; http://windowshelp.microsoft.com/04/2007; p. 1-2.

US Patent and Trademark Non-Final Office Action in co-pending U.S. Appl. No. 11/978,803, filed Oct. 30, 2007; dated May 11, 2011.

US Patent and Trademark Non-Final Office Action in co-pending U.S. Appl. No. 11/978,803, filed Oct. 30, 2007; dated Apr. 24, 2014.

US Patent and Trademark Non-Final Office Action in co-pending U.S. Appl. No. 11/978,803, filed Oct. 30, 2007; dated Oct. 23, 2014.

* cited by examiner

BROWSER EXTENSION FOR WEB FORM FILL

CROSS REFERENCE TO RELATED APPLICATIONS

This application claims the benefit of U.S. Provisional Application Ser. No. 60/898,294 filed Jan. 30, 2007, which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Conventional web browsers may have provided a sub-optimal experience for some enterprise applications. An enterprise application may include software hosted on an application server that provides services to users belonging to an enterprise. A conventional web browser may have required applications, including enterprise applications, to deliver content and functionality in a browser window using hypertext markup language (HTML), JavaScript, and so on. While providing an open, generic, global approach to content delivery, this requirement may have limited the richness of possible interactions between web browsers and enterprise applications.

To address these limitations, some browsers have employed plug-ins and/or web browser extensions. Plug-ins may be added to a browser to provide additional functionality. For example, a generic browser may not be able to display graphics of a certain type. Thus, a type-specific plug-in may be provided to the browser to facilitate displaying that graphics type. However, an application providing the content of that graphics type may still be limited to display only in the browser window.

Firefox® is a web browser supported by the Mozilla Foundation. Firefox® employs a browser extension manager to manage web browser extensions. A web browser extension is a code package that can be installed into a browser and/or client device (e.g., computer) running a browser. The extension may add a new feature to a browser, extend an existing functionality, modify a visual theme, and so on. This browser may employ an extensible markup language (XML) user-interface language (XUL, pronounced zuul) to describe and support application user interfaces. XUL provides an overlay functionality that facilitates merging user interfaces from different sources into one user interface (ui). For example, ui from a browser and a browser extension(s) may be merged. Recall that a browser extension may provide additional functionality for a browser. This functionality may include, for example, additional ui features (e.g., toolbar, menu) that facilitate customizing a browser ui.

The collective ui adornment for a browser (e.g., border, menus, frames, toolbars, buttons, scrollbars) may be referred to as "browser chrome" or just "chrome". A browser extension may interact with the browser chrome. A browser extension may include a XUL file(s), JavaScript, a style sheet(s), an image(s), and so on. This set of items may be loaded into a single package (e.g., Zip file). The package may be loaded into, unwrapped by, and installed on a client device associated with a browser. Once installed, package components may be operably connected to a browser and/or browser object(s) using the XUL overlay feature. Though added to a browser, browser extension code may remain separate and removable. An extension may reside in a browser and/or client device rather than being part of a web page transmitted by a web service (e.g., enterprise application) to the browser and/or client. So, conventional systems may employ functionality (e.g., XUL) to facilitate enhancing web browsers via web browser extensions.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
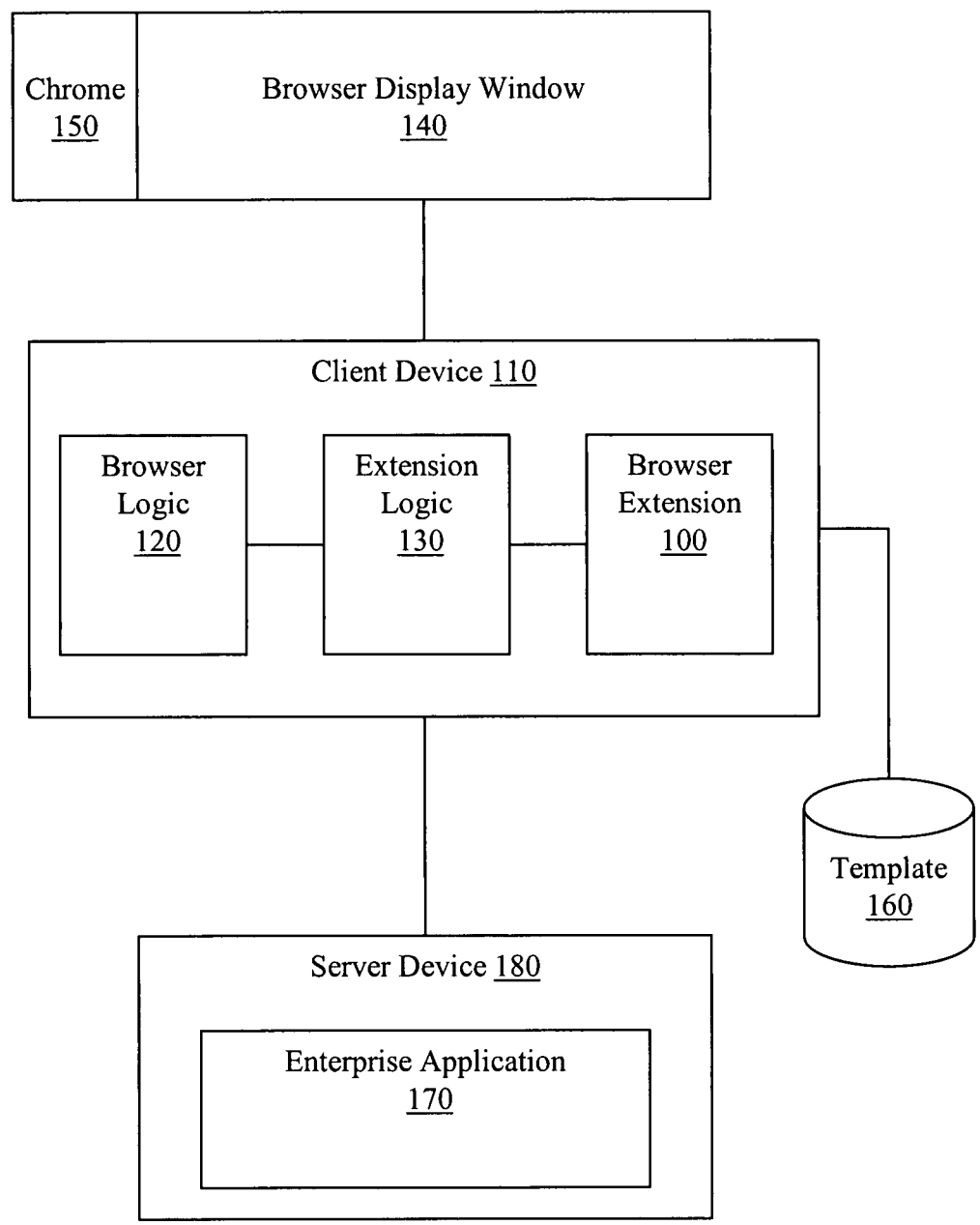
FIG. 1 illustrates a web browser interacting with an enterprise application using a web browser extension.

In one embodiment, a browser extension is configured to identify that a web page has editable fields and to create a template to store information useful for repetitive field-filling. In one example, the browser extension can be a combination of a capture extension and a fill extension that together mitigate issues associated with repetitive field entry. Once installed on a client device, the browser extension may logically and/or physically become part of a browser. In one example, the browser extension may deal with forms into which input fields have been encapsulated. Thus, the term "form" is used herein. A "form" may refer to a set of input fields encapsulated into a form on a well-formed HTML page. A "form" may also refer to a set of input fields on a malformed HTML page that are not encapsulated into a form.

Definitions

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software in execution, and/or a combination thereof. For example, a computer component can be, but is not limited to being, a process running on a processor, a processor, an object, an executable, a thread of execution, a program, and a computer. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, a CD-ROM, other optical medium, a RAM (random access memory), a ROM (read only memory), and other media from which a computer, a processor or other electronic device can read.

"DOM", as used herein, refers to a document object model. A DOM is a platform and language neutral interface that allows entities (e.g., programs, threads, scripts) to dynamically access and manipulate the content, structure, and/or style of a document (e.g., web page).

"Logic", as used herein, includes but is not limited to hardware, firmware, software, software in execution, and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms (e.g., routines, modules, methods, threads, programs) including separate applications or code from libraries (e.g., dynamically linked library (DLL)). Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated that computer-readable and/or executable instructions can be located in one logic and/or distributed between two or more communicating, co-operating, and/or parallel processing logics and thus may be loaded and/or executed in serial, parallel, massively parallel and other manners.

"User", as used herein, includes but is not limited to one or more persons, software components, computers or other devices, or combinations of these.

FIG. 1 illustrates how a browser may interact with an enterprise application using a web browser extension. A client device 110 may run a browser using a browser logic 120. The client device 110 may interact with a server device 180 running an enterprise application 170. The client device 110 may display output produced by the browser logic 120 in a browser display window 140.

During the course of working with enterprise applications (e.g., web-based applications, enterprise application 170) users may operate on web pages having a form(s) (e.g. a data entry form page). In an enterprise where the application is used frequently, an enterprise member may end up filling in the same field values over and over. For example, when a web-page that includes a client contact form is visited, values for data fields in the client contact form may be re-entered by the user. These fields may include, for example, contact name, contact likes, contact discount percentage, and so on. While a client contact form and three fields are described, it is to be appreciated that different types of forms including different types and numbers of fields may be employed.

Client device 110 may include a browser logic 120 that provides a base amount of browser functionality. Client device 110 may also include an extension logic 130 to facilitate having browser logic 120 interact with a browser extension 100. Browser extension 100 may provide additional functionality to browser logic 120. While extension logic 130 and browser extension 100 are illustrated separate from browser logic 120, it is to be appreciated that these logics may, in some examples, reside in a single logic. Output from the browser logic 120 and the browser extension 100 may be merged onto the browser display window 140 and/or "chrome" 150 that adorns the browser display window 140.

In one example, the browser extension 100 may be a combination of a form capture extension and a form-fill extension that together mitigate issues associated with repetitive form entry. The browser extension 100 may be embodied as software and may be provided as a part of an Enterprise Web Browser Extension or as a separate web browser extension. Once installed on client device 110, the browser extension 100 may logically and/or physically become part of the browser logic 120.

In one example, an extension may include logics to capture available editable fields on web pages and framesets within web pages, to present the captured fields to a user for editing, to store field data under a template name and to associate the template to the user and/or web page, to retrieve saved field data, to apply the retrieved field data back into associated form fields on a web page, and so on. This type of extension is discussed in connection with FIG. 2.

The browser extension 100 may include a web form capture logic. This logic may perform a capture function to templatize a web page and create a re-usable template (e.g., template 160). When a user visits a web page in which data values are to be input into form fields, the capture function can be initiated to templatize the web page. In one example, the web form capture logic begins an introspection process that scans the web page to determine editable fields that are present. This introspection process can determine a likely label for editable fields. The results of the introspection process can then be displayed to the user via a user interface element (e.g., dialog box, window). The user interface facilitates receiving edits and/or additional information concerning the template 160.

A template that is created, stored, and associated with a particular web page may then be used when the web page is subsequently visited. Once the web page is loaded and it is determined that there is an associated template, a user may decide to use the available template to fill fields in a form. The browser extension 100 may then retrieve the template 160 and transfer values from the template 160 into the corresponding fields on the web page form. In another example, the browser extension 100 can be configured to automatically determine if a template 160 is available for a visited web page. The determination may be based on an association created between the template 160 and a web page. If an appropriate, related template exists the browser extension 100 may populate fields in the web page form using saved field values from the template 160.

Figure 2:
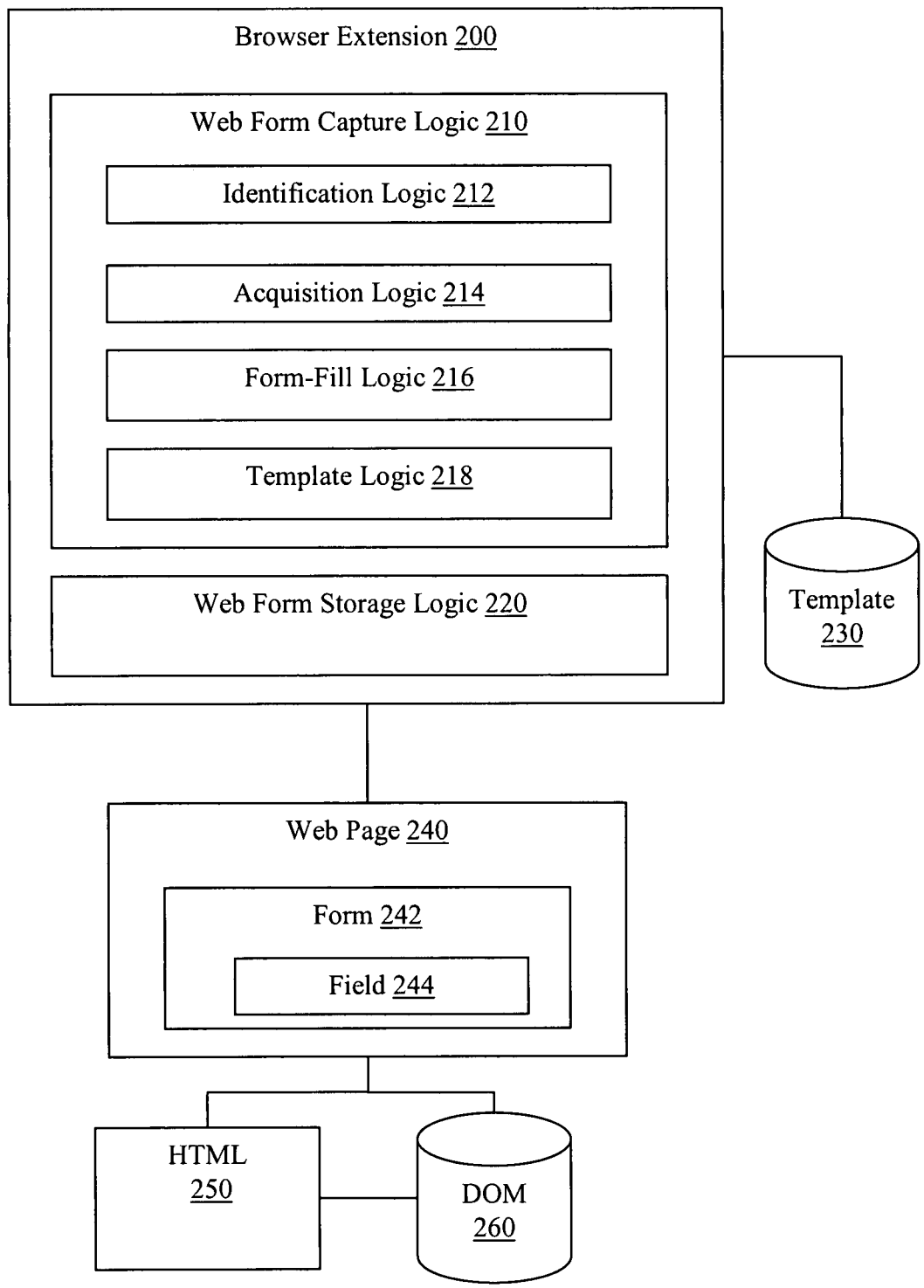
FIG. 2 illustrates a browser extension that includes logics to capture web form information and to fill web forms.
Figure 10:
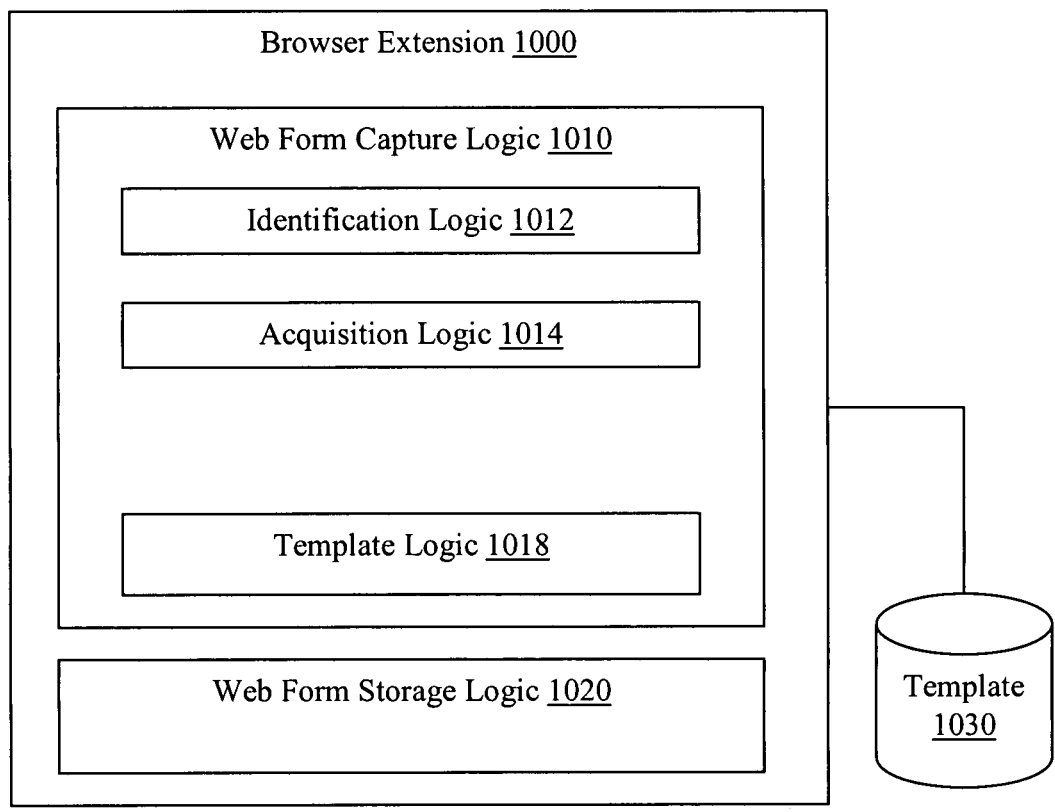
FIG. 10 illustrates a browser extension that includes logic to capture web form information.
Figure 11:
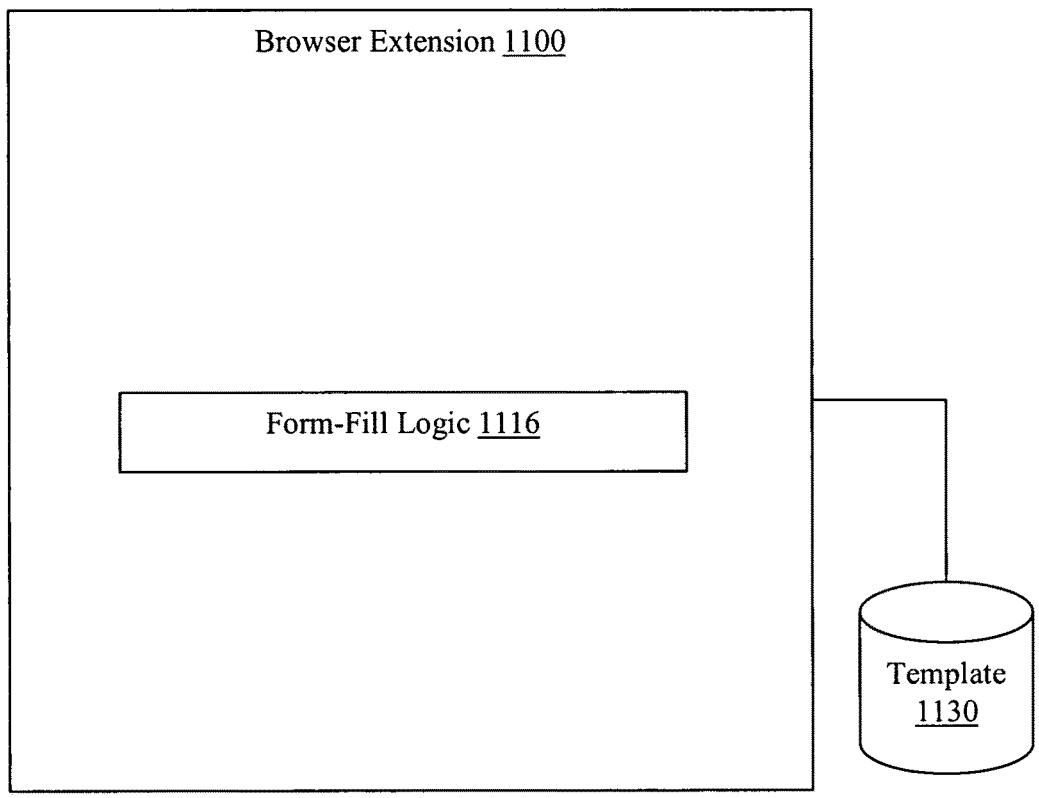
FIG. 11 illustrates a browser extension that includes logic to fill a web form.

FIG. 2 illustrates an example browser extension 200. Other example browser extensions are illustrated in FIGS. 10 and 11. Browser extension 200 may facilitate interacting with a web page 240 that includes a form 242 having an editable field 244. Field 244 may be a field that is repetitively filled by enterprise users interacting with an enterprise application. Thus, browser extension 200 may include a web form capture logic 210 and a web form storage logic 220 that facilitate creating and using a template 230 to perform tasks associated with repetitive filling of field 244. Web page 240 need not be a single web page having a single form. Web page 240 may be, for example, a web page that is part of another web page, a web page having multiple forms, a web page having a set of frames, and so on. Therefore, browser extension 200 may repetitively (e.g., recursively) process web page 240 and its elements.

While a single form 242 and a single field 244 are illustrated, it is to be appreciated that web page 240 and/or other web pages may have a greater number of forms and/or fields. In one example, the browser extension 200 may be provided by an enterprise application associated with the web page 240. In this way, new enterprise applications can interact with existing web browsers and still provide a rich experience with application specific functionality by providing a browser extension configured to deal with an enterprise application.

Web form capture logic 210 is configured to acquire information about web page 240, form 242, and/or field 244. This information may then be used to create a template 230. The template 230 may be stored by web form storage logic 220. The template 230 may be stored, for example, in memory, on disk, on a computer-readable medium, and so on. Processing performed by the web form capture logic 210 may be invoked in different ways. In one example, a user may select a templatize action from a user interface element (e.g., menu). In another example, browser extension 200 may monitor loaded web pages and automatically control web form capture logic 210 based on a relationship between a loaded web page and a template.

In one example, the web form capture logic 210 is configured to include an identification logic 212, an acquisition logic 214, a form-fill logic 216, and a template logic 218. Identification logic 212 may identify that web page 240 includes a form 242 and an editable field 244 associated with form 242. In one example, identifying that web page 240 includes a form may include receiving a form present signal (e.g., from a user), determining that web page 240 includes a form identifier, and determining that metadata associated with web page 240 indicates the presence of a form. This metadata may include, for example, a tag associated with identifying a form. In one example, identification logic 212 may identify an editable field 244 associated with form 242 by examining hypertext markup language (HTML) 250 associated with web page 240, and/or elements of a document object model (DOM) 260 associated with the web page 240. Examining the HTML 250 and/or the DOM 260 may identify structure relevant to a form-based task. A determination concerning the presence of form 242 and/or field 244 may be based on this structure.

The acquisition logic 214 can be configured to acquire a first set of information associated with the field 244. The acquisition logic 214 can also present a user interface to acquire a second set of information associated with the field 244. The user interface presented by acquisition logic 214 may also accept an edit(s) to the first set of information. In one example, the first set of information may include a field identifier, a field type, a field label, a pointer to an instance of a field, and a field value. In one example, the second set of information may include a field value, a field formula, a visibility rule, a template title, and so on. Thus, information concerning the field may include data (e.g., values), metadata (e.g., field type), and/or information to control access to data.

Acquiring the first set of information and the second set of information may include automated actions and/or interactions with a user. For example, a field label may be acquired by finding a label tag wrapped around some text associated with the editable field, extracting the text, and establishing the extracted text as the field label. If this action is unsuccessful, acquiring a field label may include finding a text label adjacent to an editable field, extracting some text from the text label, and establishing the field label as the extracted text. If this action also provides an unsatisfactory result, then a field label may be acquired by finding a text label within a threshold distance of the editable field, extracting some text from the text label, and establishing the field label as the extracted text. As a default, if none of the above actions have provided a satisfactory result, the field label may be set to the field DOM identifier. The acquisition logic 214 may, in some examples, acquire a field value by interacting with a field access method associated with the editable field. This field access method may be, for example, a method available for an object.

In one example, the acquisition logic 214 is configured to present a user interface element (e.g., dialog, window) to a user to accept edits to the first set of information and/or to acquire elements of the second set of information. In one example, presenting the user interface element may include presenting a dialog box having at least one user controllable element. The user controllable element may be, for example, a text field, a check box, and so on. Acquiring the second set of information through the user interface may include acquiring a default value for a field in a form, acquiring a formula for populating a field in a form, acquiring a visibility rule for a template related to a form, acquiring a title for a template, acquiring a value for a first indicator that controls whether an editable field is to be included in a template associated with a form, acquiring a value for a second indicator that controls whether an editable field is to be user-editable, and so on.

A template originates from a single web page. However, the association of the template to the web page may not necessarily be maintained. Thus, a visibility rule is associated with a template and controls when a template associated with a web page is to be accessible. The visibility rule determines the association (e.g., originating page, domain, any web page) and controls when a template is to be accessible. The visibility rule may control the template to be available at times including, when the web page is viewed, when a web page in the same domain as the web page is viewed, when a web page associated with an enterprise application associated with the web page is viewed, when a web page belonging to the enterprise that owns the web page is viewed, and when any web page is viewed. While a number of visibility rules are described, it is to be appreciated that a greater and/or lesser number of visibility rules may be employed.

Template logic 218 can be configured to create a form-fill template using values from the first set of information and the second set of information. The form-fill template may be stored as template 230. In one example, creating the form-fill template may include creating a data structure (e.g., record, object, struct data-type) that can be populated with values from the first set of information. The data structure may also include metadata that may be populated with values from the second set of information. The data structure may be referred to as a template. Having created and populated the data structure, template logic 218 may establish a relationship between the template and a web page and then store the form-fill template.

As described above, browser extension 200 can identify that a web page has a form with editable fields and create a template to store information useful for repetitive form-filling. Therefore, browser extension 200 can also be configured to include a form-fill logic 216 to make use of the template. While the form-fill logic 216 is illustrated inside web form capture logic 210 and inside browser extension 200, it is to be appreciated that in some examples the form-fill logic 216 could reside outside the web form capture logic 210 and, in some examples, may even reside in a separate browser extension. Thus, a browser extension 1000 (see FIG. 10) that does not include a form-fill logic is illustrated as is a browser extension 1100 (see FIG. 11) that includes only a form-fill logic. The browser extension 1000 may perform capture actions but not fill actions. Therefore the browser extension 1000 may include a web form capture logic 1010, an identification logic 1012, an acquisition logic 1014, a template logic 1018, and a web form storage logic 1020 that cooperate to produce a template 1030. The browser extension 1100 may only perform form-fill actions. Therefore the browser extension 1100 may include a form fill logic 1116 that acquires data from a template 1130 to fill a form on a web page.

Returning to FIG. 2, while a web page is analyzed by the form-fill logic 216, the logic 216 may determine that the web page has a form to fill. The form-fill logic 216 may also determine that the form has a set of writable fields. Having made these determinations, form-fill logic 216 may then identify a set of templates that are available to participate in filling a writable field in the form to fill and/or on the page having an editable input field to fill that is not encapsulated in a form. Form-fill logic 216 may examine the set of templates and then select a member of the set of templates to participate in filling the writable field. Having selected a template, form-fill logic 216 may then fill in the writable field based, at least in part, on a value, rule, formula, and so on, associated with the selected template. In one example, the selected template may only include values and thus not include rules and/or formulae. In another example, a template may have been established as a "go and fill" template. The behavior of a "go and fill" template is, upon invocation, to first navigate to an associated page and then, upon a successful page load, to fill fields based on the template.

In different examples the form-fill logic 216 can be configured to determine in different ways that a web page has a form to fill. In one example, the form-fill logic 216 may receive a signal from a user indicating that a web page has a form and that a form-fill action is to be taken. In another example, form-fill logic 216 may automatically determine that a web page has a form by examining a form identifier, by examining metadata associated with the web page, and so on.

Form-fill logic 216 may have a set of templates available from which data can be acquired to fill a form. In one example, selecting a member of the set of templates may include examining a relationship between the member and the web page. This relationship may have been established by the template logic 218 when the template was created. Selecting a member may also include examining a visibility rule associated with the member. The visibility rule may have been selected by manipulating a control on the user interface presented by the acquisition logic 214. Selecting a member may also include comparing a set of user rights with a set of rights associated with the member, comparing a user context to a context associated with the member, and so on. In one example, a user may select the template to use. While a number of selection criteria are identified, it is to be appreciated that a greater and/or lesser number of criteria may be employed.

With a template available to provide information for filling a form, form-fill logic 216 may then fill a writable field. In one example, filling the writable field may include copying a value for the writable field from the selected member. However, in some examples, a template may store information other than simply a value. For example, a template may store a formula or rule that can be used to compute a value for a writable field. Therefore, form-fill logic 216 may fill a writable field by computing a value for the writable field from a formula in a template, by determining a value for the writable field from a rule in a template, and/or by determining a value for the writable field from metadata associated with a template.

The browser extension 200 can be implemented to automatically fill fields in a web form. Recall that browser extension 200 may also automatically fill fields that are not encapsulated in a form in a well-formed HTML page. The browser extension 200 may also take actions to make a user aware that the fields have been filled. For example, browser extension 200 may control the form-fill logic 216 to manipulate a portion (e.g., filled field) of a web page to visually indicate that a written field has been filled by the form-fill logic 216. It is to be appreciated that in one example a separate visual effect logic may be provided in browser extension 200 and that in another example a separate browser extension may include logic to provide the visual effect.

In one example, providing the visual effect may include manipulating a portion of a web page that includes filled fields. The manipulating may include, for example, manipulating the color of a filled field, manipulating the font of a filled field, manipulating the size of a filled field, animating a filled field, and so on. In one example, these effects are to be transitory, where a more constant look and feel is temporarily replaced with a changing attribute. Therefore, in one example a portion associated with a filled field may be manipulated for a configurable period of time. This period of time may be user selected, automatically computed based on the number of fields filled, and so on. By way of illustration, the background color of a field may be changed when the field is written but may transition back to the original color over a short period of time (e.g., two seconds). This changing color may attract the attention of a viewer to the written field.

Different field types may be more readily visually identified than others. Also, different field types may be more prominent than others. Therefore, form-fill logic 216 may cause a writable field to be manipulated according to a field-specific effect. Additionally, form-fill logic 216 may fill fields and/or apply a visual effect in a determined order. For example, when a form is to interact with an English speaker, the order may be top-down and left-to-right. However, when a form is to interact with speakers of certain languages or is to be broadcast in a manner that may create viewing reversal (e.g., mirror reflection), then the order may be different. In one example, the form-fill logic 216 is to manipulate the written fields using a combination of effects, order, and timing to produce a waterfall pattern to visually indicate a set of fields filled by the form-fill logic.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical transformations of physical quantities (e.g. change data values, change states of a component, etc). Usually, though not necessarily, the physical quantities take the form of electrical or magnetic signals capable of being stored, transferred, combined, compared, and otherwise manipulated in a logic and the like. It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms like processing, transmitting, retrieving, communicating, calculating, determining, displaying, and so on, refer to actions and processes of a computer system, logic, processor, or similar electronic device that manipulates and transforms data represented as physical (electronic) quantities.

Figure 3:
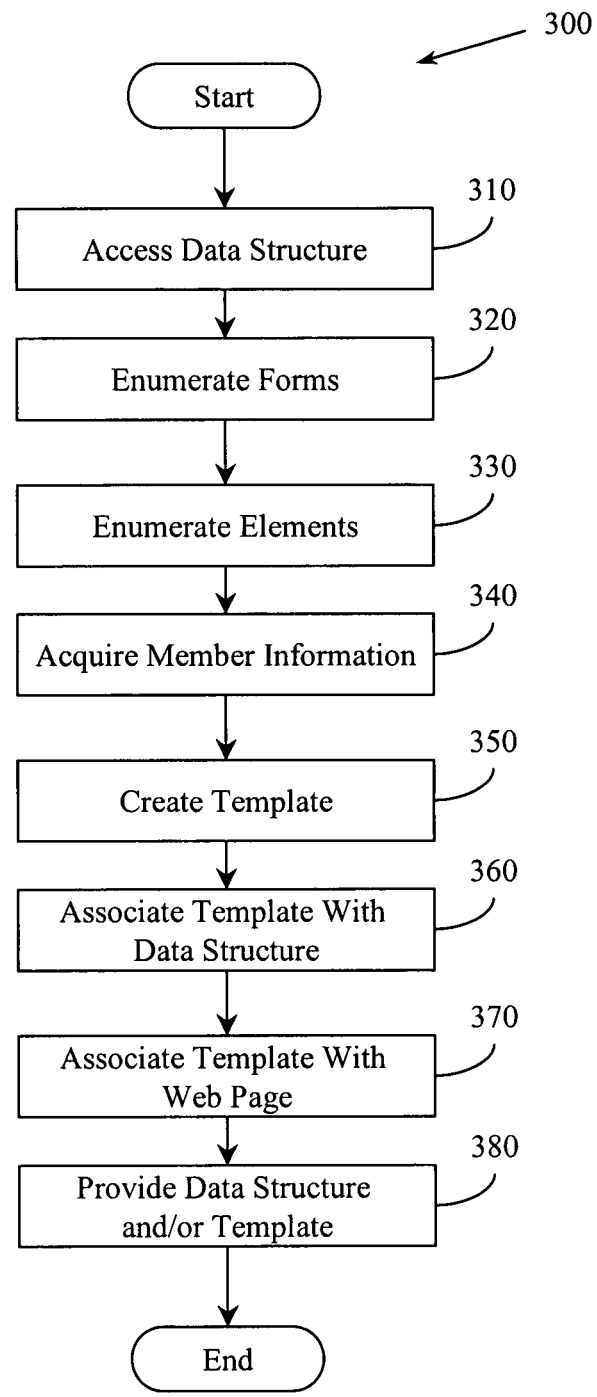
FIG. 3 illustrates a method associated with browser extension based form capture.

FIG. 3 illustrates a method 300 associated with a web form capture process. Method 300 may include, at 310, accessing a data structure that facilitates accessing and/or manipulating stored information associated with a form on a web page to be processed by a web browser. In one example, the data structure is a global associative array that facilitates storing, manipulating, and/or retrieving templates.

A web page may include a frameset. Therefore method 300 may include enumerating a set of frames in the frameset and performing actions 320 through 380 for different members of the frameset. Similarly, a DOM associated with a web page may include an iframe. Therefore method 300 may include enumerating a set of iframes and performing actions 320 through 380 for members of the set of iframes.

A web page may have a set of forms defined in a DOM associated with the web page. Therefore method 300 may include, at 320, enumerating the set of forms defined in the DOM. Similarly, a form may have a set of elements. Therefore method 300 may include, at 330, enumerating a set of elements for the form.

Once the elements (e.g., writable fields, editable fields) have been identified, method 300 may continue, at 340, by acquiring a set of information for a member of the set of elements. This information may include, for example, data (e.g., values), metadata (e.g., type), and so on. The member of the set of elements may be a writable field. Acquiring the set of information for a writable field may include a number of actions. These actions may be performed upon determining that the member is not of the type password, hidden, button, or image, is not in a protected list, and does not have a read-only attribute or disabled attribute. Acquiring the set of information may include, for example, acquiring a field identifier for the writable field, acquiring a field type for the writable field, and acquiring a pointer to the instance of the writable field. Acquiring the set of information may also include acquiring a field value for the writable field, which may involve using an access method associated with the field type for the writable field. Acquiring the set of information may also include acquiring a field label for the member.

Acquiring the field label may be part of an introspection process that includes a set of actions. For example, acquiring the field label for the writable field may include establishing the value of the field label as the innerText attribute of the label tag node upon determining that the field identifier is associated with an HTML label tag whose For attribute is set to the field identifier. Acquiring the field label may, additionally and/or alternatively, include proximity searching for a label. The proximity search may start at the parent node of the writable field and read text that precedes and/or succeeds the writable field. When other field label acquisition actions fail to produce a desired result, the field label may be set to the field identifier.

Acquiring the value for a writable field may be performed in different ways for different field types. For example, acquiring the field value for a text box may include reading the value attribute of the text box. Similarly, acquiring the field value for a text area may include reading the value attribute of the text area. However, acquiring the field value for a set of radio buttons may not involve reading text attributes, but instead may include determining the group name of a set of radio buttons, enumerating the members of the set of radio buttons, and determining a selected value for the set of radio buttons. Similarly, acquiring the field value for a check box may not include reading text but may include determining the value of a checked attribute for the check box. A select field may also prompt distinct actions. These actions may include, for example, determining a mode (e.g., multi, single) for the select field and returning the value of a selected field(s) from an associated data structure (e.g., options array). While a number of field types (e.g., text box, radio button, check box) are described, it is to be appreciated that a greater and/or lesser number of field types may be processed.

With the elements identified and information concerning those elements gathered, method 300 may continue, at 350, by creating a template. Creating the template may include, for example, aggregating the set of information into an object. The template may be, for example, a structure (e.g., C struct), an object, an array, a database entry, and so on.

Since example browser extensions and methods described herein may wish to retrieve stored information to fill fields in a form encountered on a subsequent viewing of a web page, method 300 may include, at 360, associating the template with the data structure and, at 370, associating the template with a web page. The associating may include, for example, manipulating a pointer, manipulating a value in the data structure, updating a database record, updating an index, and so on. Method 300 may conclude, at 380, by providing the data structure and/or object to a form-fill process.

Figure 4:
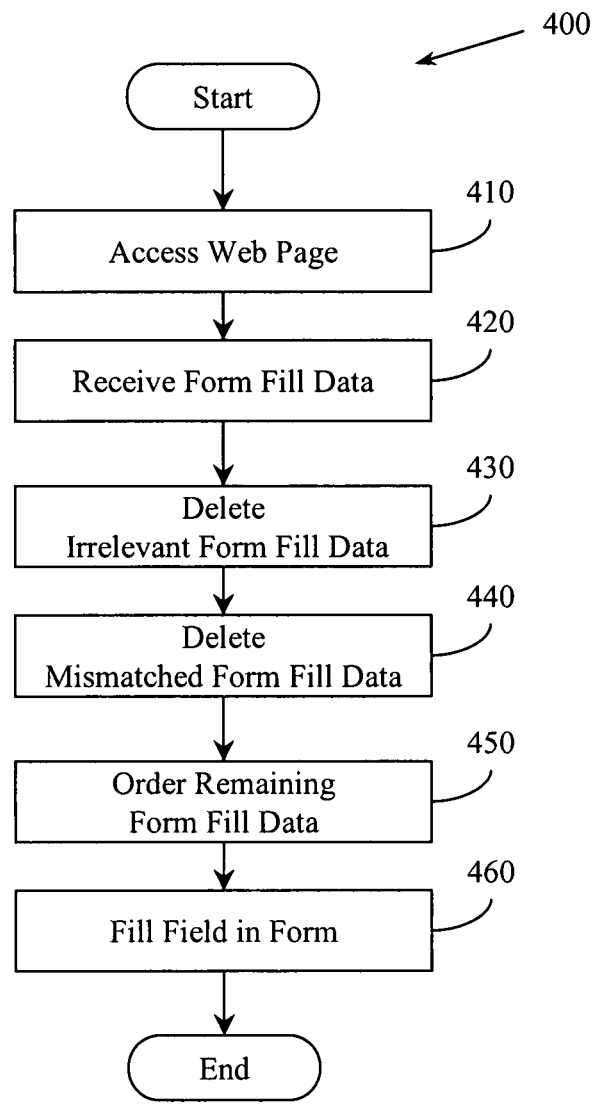
FIG. 4 illustrates a method associated with browser extension based form-fill.
Figure 5:
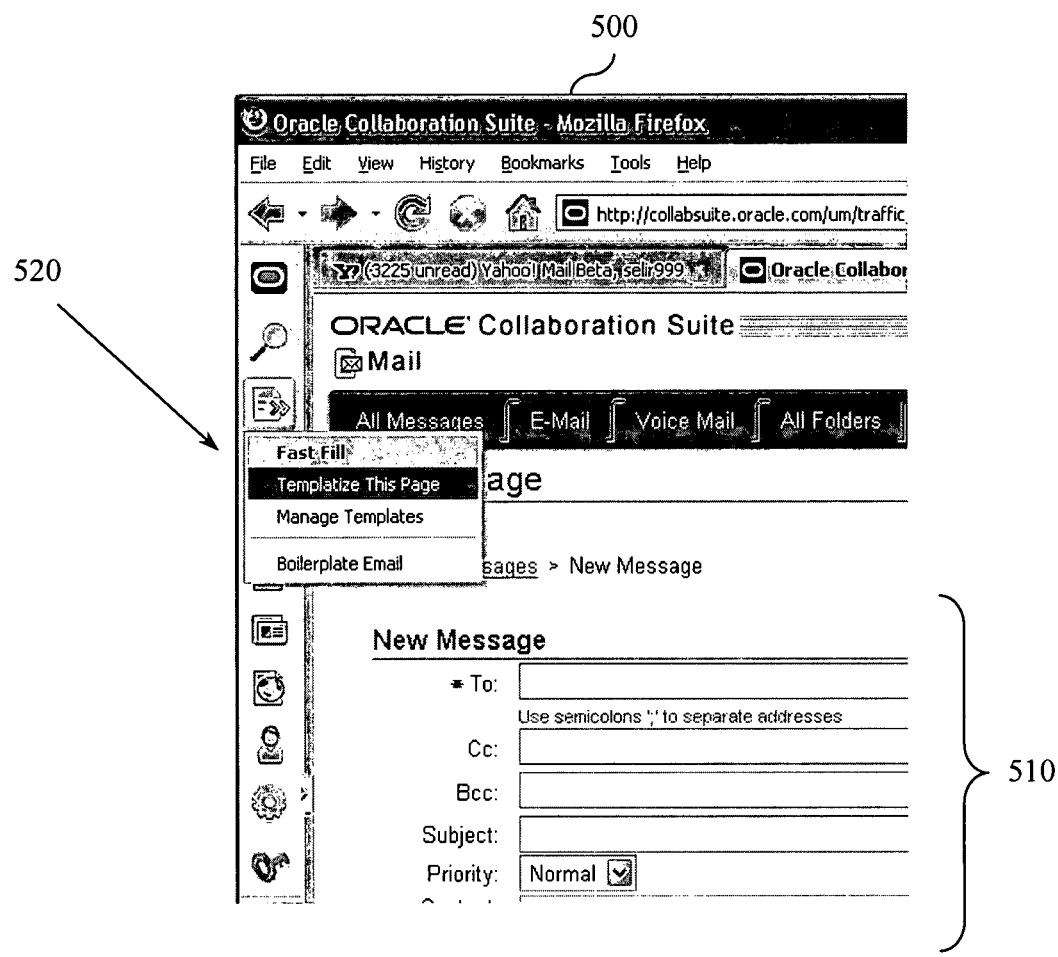
FIG. 5 is a simulated screen shot associated with at least one aspect of an example browser extension.

FIG. 4 illustrates a method 400 associated with a web form-fill process. Method 400 may process data saved in a template produced by a method like method 300 (FIG. 3). The template may store information that can be used to fill a form on a visited web page. Therefore, method 400 may begin, at 410, by accessing a web page that includes a form to be filled.

Knowing that the web page includes a form to be filled, method 400 may continue, at 420, by receiving a set of form-fill data related to the form. This form-fill data may be associated with a template. The form-fill data may include relevant data and irrelevant data. Members of the set of form-fill data may include a field identifier, a field value, and a field type. This information may be used to determine whether a field is relevant and, if so, may provide a value to fill a writable field in the form.

Method 400 may also include, at 430, deleting irrelevant form-fill data. This may include deleting a member of the received (e.g., local copy) of form-fill data set upon determining that the member is not associated with an instance of a field in the form. By way of illustration, the form may only include five fields and the form-fill data associated with a template may have information and values concerning ten fields. Therefore five of the available fields may be irrelevant to the form to be filled. This situation may arise when a form can be accessed by users with different rights, different roles, and different contexts. In one example, a notification may be provided when a field is deemed to be irrelevant and thus "dropped". This notification may be provided, for example, to a user.

Method 400 may also include, at 440, deleting mismatched form-fill data. This may include deleting a member of the received form-fill data set upon determining that a field in the form corresponds to a member of the set of form-fill data but the field types do not match. This situation may also arise when a form can be accessed by users having different rights, roles, and contexts.

The actions performed at 430 and 440 may reduce the received form-fill data set. Method 400 may therefore include ordering the remaining set of form-fill data at 450. The ordering may depend, at least in part, on an order of fields in the form. Ordering the fields facilitates filling a set of writable fields in a desired order. The desired order may be related to a context (e.g., locale), language, and so on. The desired order may also be related to producing a desired fill effect (e.g., cascade).

Method 400 may conclude, at 460, by filling a writable field with a value determined, at least in part, by data associated with a form-fill element corresponding to the writable field.

Filling the field may include both providing a value for the writable field and applying a visual effect to the writable field. The visual effect may be designed to indicate to a user that the writable field has been written. In one example, the visual effect may be a field-type specific visual effect. The field-type specific visual effect may be determined, at least in part, by the field-type of the field to be filled. For example, for a text box, a selection, and a text area, applying the field-type specific visual effect may include storing the current background color for the writable field, changing the background color to a form-fill effect color, and transitioning the background color back to the original color over a period of time. Some fields may not have a background color. Therefore, applying the field-type visual effect may include for a check box and a radio button, storing the opacity of the writable field, changing the opacity to a form-fill effect opacity, and transitioning the opacity back to the original opacity over a period of time.

Figure 6:
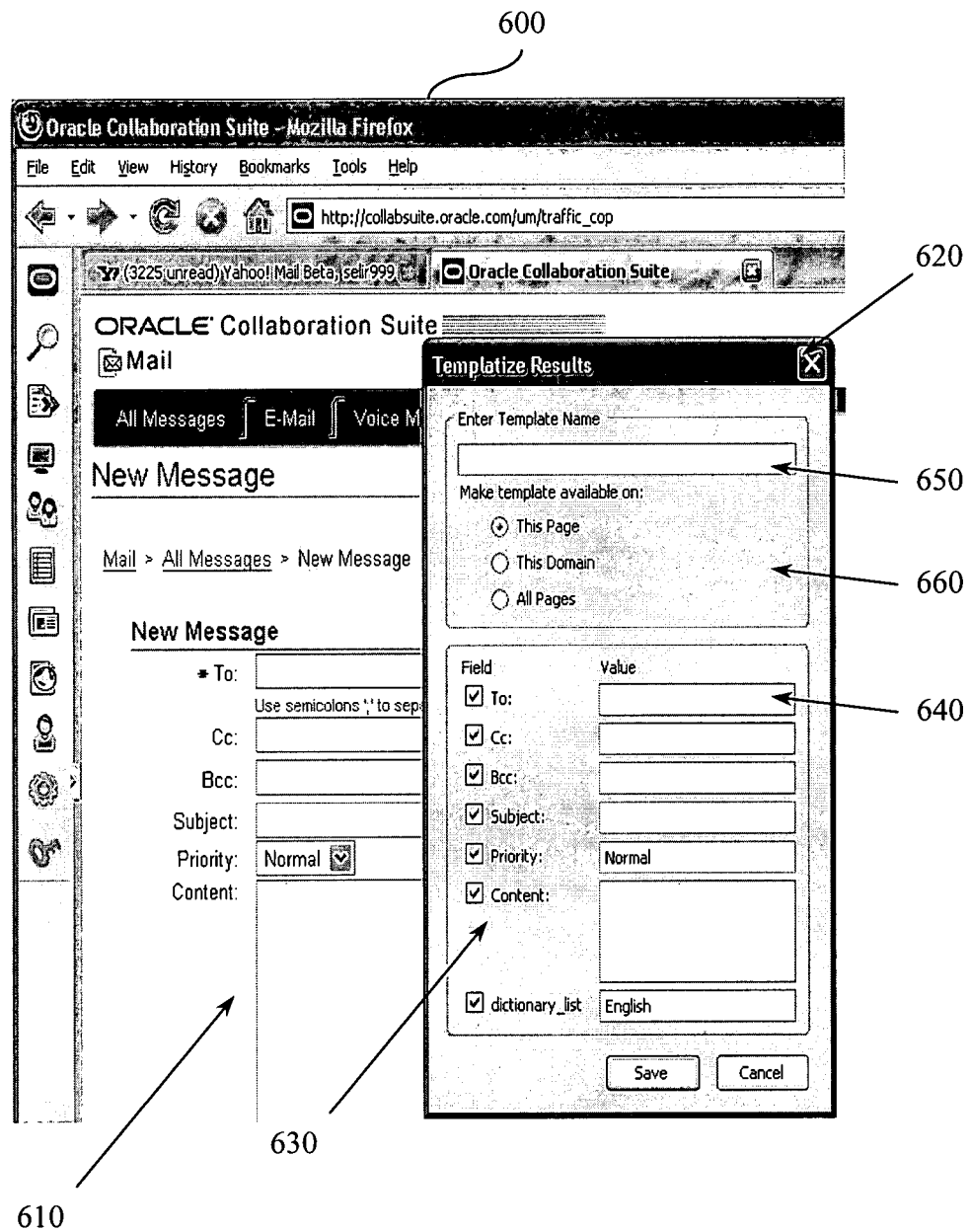
FIG. 6 is a simulated screen shot associated with at least one aspect of an example browser extension.

Simulated screen shots illustrate form capture and fill actions associated with example browser extensions and methods described above. Simulated screen shot 500 illustrates a form 510 and a menu 520. A user may navigate to a web page having form 510. The user may want to create a template for the form 510. The user may select an entry on the menu 520. The menu may be displayed, for example, in the browser chrome. Choosing the menu item may initiate a templatize function. As part of the templatize function, a browser extension may perform a form field introspection to find fields on the form 510 that are appropriate for inclusion in a template. The appropriate fields may be, for example, editable and/or writable fields. The identified fields and other editing options may then be presented in a templatize dialog (see screen shot 600, FIG. 6) that allows a user to make edits to the template and/or to acquire additional information (e.g., visibility rule).

In one embodiment, introspection is implemented to scan and parse an object or a set of objects to understand their structures and to determine structures that are relevant for a particular task. Introspection applied to create a template may include reviewing a web page that includes HTML tags. Introspection may also include reviewing a DOM associated with the HTML tags. In this manner, introspection can find forms within the objects, and fields within the forms. From the identified fields, introspection may determine which are editable fields and/or other types of fields. Thus, content within a web page is parsed to reveal and determine fields that are potentially safe to edit, while filtering out or excluding non-editable fields and/or fields that may be inappropriate fields. For example, inappropriate fields can include login, password, and social security number fields that may be inappropriate to edit for security reasons.

Simulated screen shot 600 illustrates an example templatize dialog 620. Dialog 620 may include fields identified in form 610 during a templatize process. By interacting with the templatize dialog 620, a user can review the fields available for inclusion in a template. For fields found in the web page by the templatize process, the following may also be displayed: a label most likely associated with the field, a value entered into the field at the time of capture, and a checkbox enabling the user to include or exclude the field in the template. Thus, templatize dialog 620 may include an inclusion list 630 illustrated in this example as a set of check boxes. The templatize dialog 620 may also include elements 640 in which field values may appear. The user can change the field value that gets stored as part of the template. Also, as the user changes a value in the templatize dialog 620, the associated instance of the field in the web page form can be highlighted or otherwise visually distinguished for the user.

By interacting with the templatize dialog 620, the user can choose a name to identify a template. Thus, the dialog 620 may include an element 650 into which a name can be entered. The user can also choose a visibility rule for the template. The visibility rule determines when a template is to be available to the user. Example visibility rules can include a "this page" rule, meaning the template will only be available when this web page is loaded in the web browser. The visibility rules may also include a "this domain" rule, meaning the template will only be available when a web page from this domain is loaded in the web browser. The visibility rules may also include an "all pages" rule, meaning the template will be available from all pages. In different examples, additional and/or alternative visibility rules may also be available. In one example, templatize dialog 620 may provide a set of user interface elements 660 to facilitate selecting a visibility rule.

Figure 7:
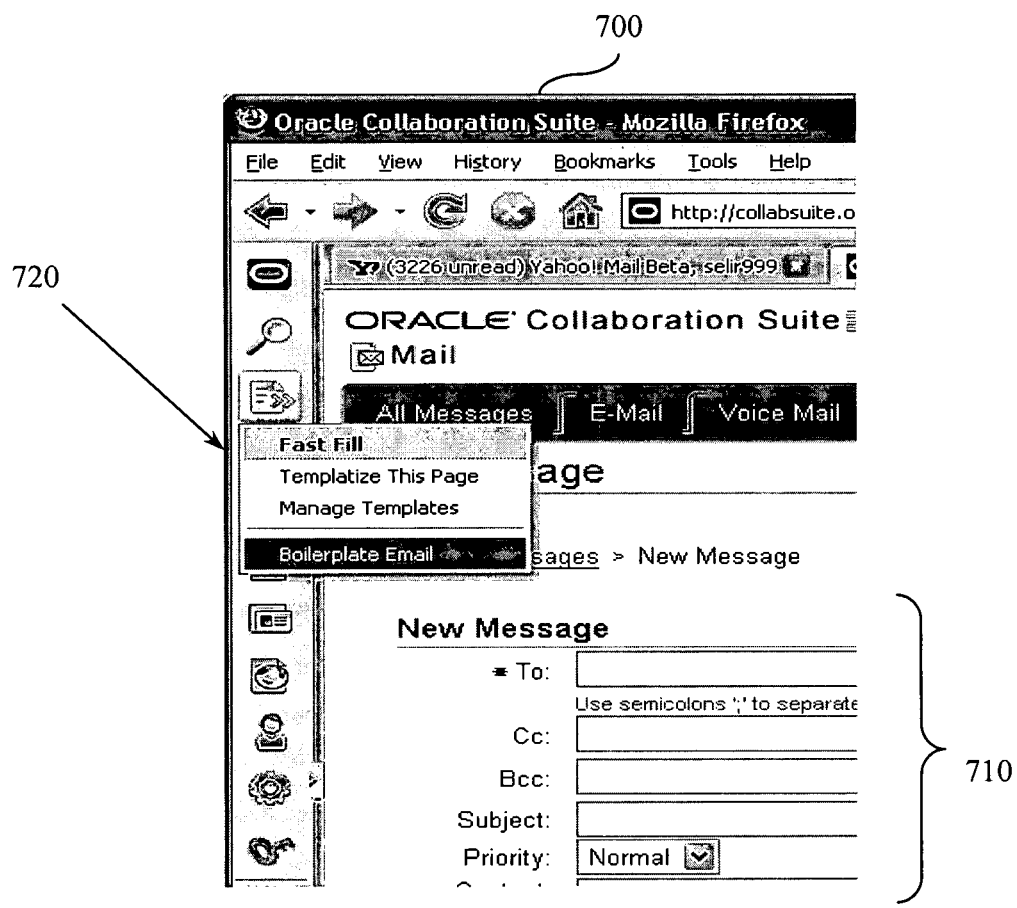
FIG. 7 is a simulated screen shot associated with at least one aspect of an example browser extension.

Turning now to FIG. 7, a simulated screen shot 700 illustrates a form 710 that a user may wish to fill, at least partially, using data stored in a template related to the form 710. An available template may be listed in menu 720. In one example, a browser extension may visually indicate that a field was filled as part of a form-fill operation. This may facilitate understanding and visually identifying which web page fields are filled as part of an automatic form-fill operation performed, for example, by a form-fill logic. In one example, a form-fill logic may operate with a web form capture logic during a form-fill operation where an editable field(s) within a web page form is to be overwritten with pre-determined content (e.g. content from a previously created and stored template). When a template is used, a visual effect can be applied to web page fields as the content is being written to them. This visual effect facilitates indicating to the user that the field value was changed.

Figure 8:
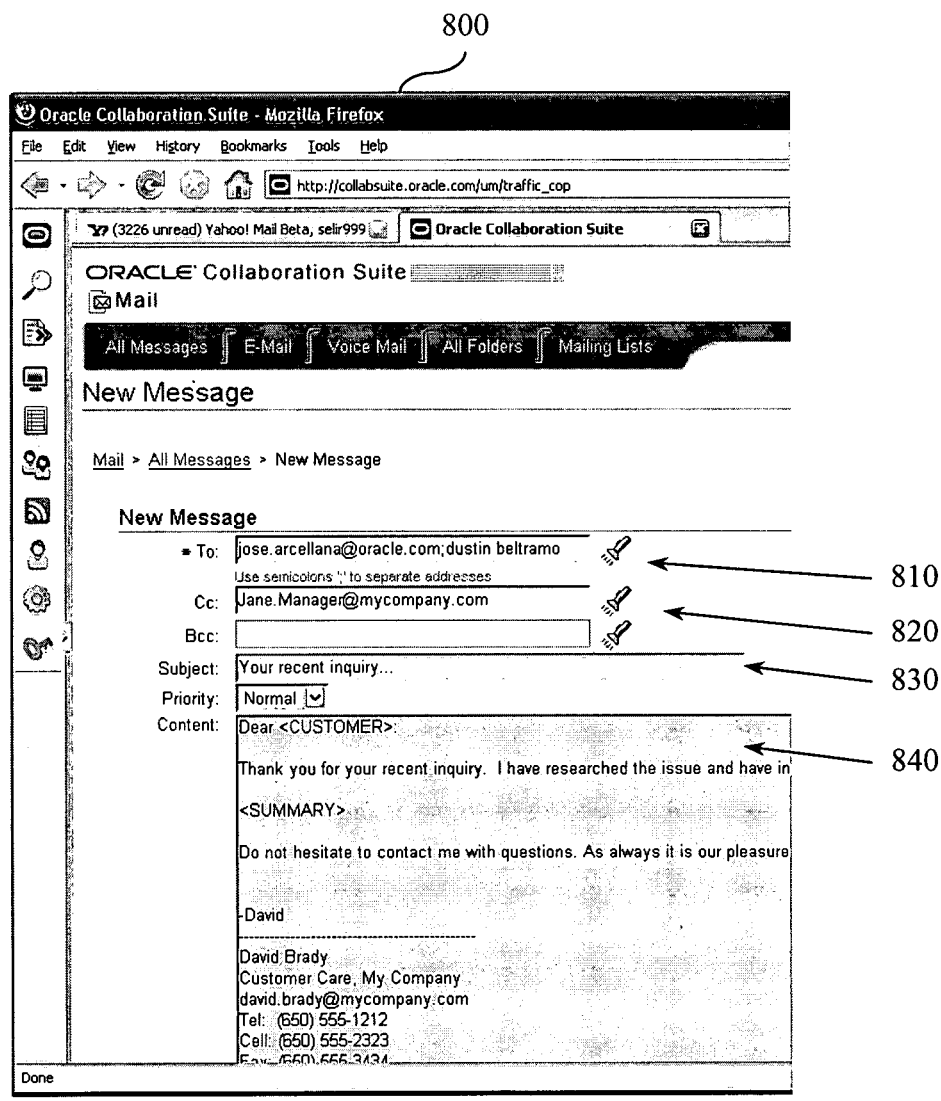
FIG. 8 is a simulated screen shot associated with at least one aspect of an example browser extension.

FIG. 8 illustrates a simulated screen shot 800 in which a visual effect has been applied to filled fields. The different colors present in fields 810, 820, 830, and 840 can indicate to a user which fields have been filled and in what order. The visual effect can be applied in different orders. For example, the visual effect can be applied top to bottom, which can create a waterfall effect. Fields at the beginning of the page can receive the effect before fields that occur later in the page. A complete fill effect duration can be limited to a selected time period (e.g. two seconds). As the number of fields increases on a page, the duration of the effect on fields may be decreased in order to complete in the overall selected time period. In one example, the selected time period may be user configurable and/or automatically determined. By way of illustration, fields 810, 820, 830, and 840 may be filled as part of a form-fill operation. A visual effect may be applied to these fields. For example, the background color of these fields may be changed. To create a waterfall and/or cascading effect, the background color of field 810 may be changed first, then the background color of field 820, then 830, and then 840. The background color may be changed and then may transition back to its original color. Thus, a ripple effect of background colors changing and then transitioning back may be achieved. In one example, the total time during which the visual effect is apparent may be limited. For example, the time may be limited to two seconds.

Figure 9:
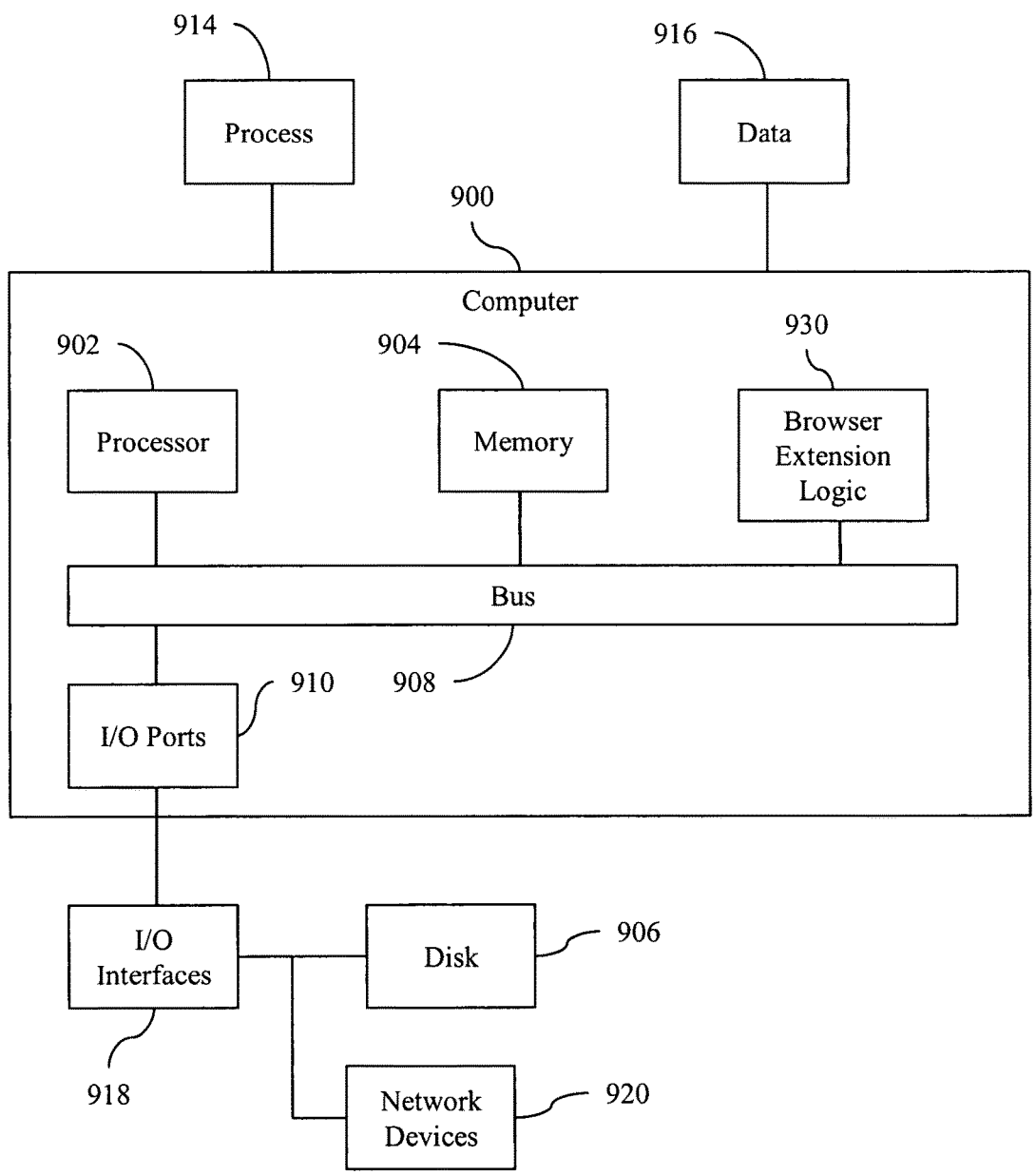
FIG. 9 illustrates an example computing device in which example systems and/or methods may operate.

FIG. 9 illustrates an example computing device in which example systems and methods described herein, and equivalents, may operate. The example computing device may be a computer 900 that includes a processor 902, a memory 904, and input/output ports 910 operably connected by a bus 908. In one example, the computer 900 may include a browser extension logic 930 configured to facilitate making a browser running on computer 900 enterprise application ready. In different examples, the logic 930 may be implemented in hardware, software, firmware, and/or combinations thereof. Thus, the logic 930 may provide means (e.g., hardware, software, firmware) for automatically determining the structure of a web page by referencing HTML associated with the web page, a DOM element associated with the web page, and so on. The structure may indicate that a form is present and thus logic 930 may provide means (e.g., hardware, software, firmware) for associating a form field on the web page with a template, means (e.g., logic) for relating the template to the web page and means (e.g., memory, disk) for storing the web page. The template may be used in repetitive form-fill operations when the web page associated with the form is subsequently viewed. Therefore, logic 930 may include means (e.g., hardware, software, firmware) for selectively retrieving the template upon determining that a web page has a writable form related to the template, and means (e.g., hardware, software, firmware) for selectively filling a field in the writable form using data, formulae, rules, and so on, stored in the retrieved template. While the logic 930 is illustrated as a hardware component attached to the bus 908, it is to be appreciated that in one example, the logic 930 could be implemented in the processor 902.

Generally describing an example configuration of the computer 900, the processor 902 may be a variety of various processors including dual microprocessor and other multiprocessor architectures. A memory 904 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, and/or a memory stick. Furthermore, the disk 906 may be a CD-ROM, a CD recordable drive (CD-R drive), a CD rewritable drive (CD-RW drive), and/or a digital video ROM drive (DVD ROM). The memory 904 can store a process 914 and/or a data 916, for example. The disk 906 and/or the memory 904 can store an operating system that controls and allocates resources of the computer 900.

The bus 908 may be a single internal bus interconnect architecture and/or other bus or mesh architectures. While a single bus is illustrated, it is to be appreciated that the computer 900 may communicate with various devices, logics, and peripherals using other busses (e.g., PCIE, SATA, Infiniband, 1394, USB, Ethernet). The bus 908 can be types including, for example, a memory bus, a memory controller, a peripheral bus, an external bus, a crossbar switch, and/or a local bus.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a local area network (LAN), a wide area network (WAN), and other networks.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer executable instructions that when executed by a computer cause the computer to perform a method, the method comprising:
    controlling at least a processor to determine that a web page being processed by a web browser includes a set of forms defined in a Document Object Model (DOM) associated with the web page, and to enumerate the set of forms defined in the DOM;
    enumerating a set of elements for the set of forms from the web page;
    acquiring a set of information for the set of elements, wherein acquiring the set of information includes acquiring information for elements that are form fields and are not of a type that indicates password, hidden, button, or image;
    creating a template by aggregating the set of information from the webpage into the template;
    associating the template with the web page;
    providing the template to a form-fill process, wherein providing the template to the form-fill process causes the set of forms in the web page to be automatically populated by using the template on a subsequent viewing of the web page, wherein the set of elements are a set of fields that can be filled with input data; and
    applying one or more field-type specific visual effects to the set of fields to be filled on a display screen, where the specific visual effects are determined, at least in part, by field-types of the fields to be filled, where the set of information includes field values for the set of elements received from a user input.

2. The non-transitory computer-readable medium of claim 1, where acquiring the set of information includes:
    upon determining that a member of the set of elements:
        is not of the type password, hidden, button, or image, and is not in a protected list; and
        does not have a read-only attribute or disabled attribute, then:
            acquiring a field identifier for the member,
            acquiring a field type for the member,
            acquiring a pointer to the instance of the member,
            acquiring a field value for the member using an access method associated with the field type for the member, and
            acquiring a field label for the member.

3. The non-transitory computer-readable medium of claim 2, where acquiring the field label for the member includes one or more of:
    upon determining that the field identifier is associated with an HTML label tag with a For attribute that is set to the field identifier, establishing the value of the field label as an innerText attribute of a label tag node,
    proximity searching for a label starting at a parent node of the member and reading one or more of, text that precedes the member, and text that succeeds the member, and
    establishing the field identifier as the field label.

4. The non-transitory computer-readable medium of claim 2, where:
    acquiring the field value for a text box includes reading the value attribute of the text box,
    acquiring the field value for a text area includes reading the value attribute of the text area,
    acquiring the field value for a set of radio buttons includes:
        determining the group name of a set of radio buttons,
        enumerating the members of the set of radio buttons, and
        determining a selected value for the set of radio buttons,
    acquiring the field value for a check box includes determining the value of a checked attribute for the check box,
    acquiring the field value for a select field includes:
        determining a mode for the select field, the mode being one of a multi-mode and a single mode, and
        returning the value of the selected field from an associated data structure.

5. A non-transitory computer-readable medium storing computer executable instructions that when executed by a computer cause the computer to perform a method, the method comprising:
  controlling a processor to determine that a web page includes at least one form, and analyzing the web page to identify a set of form fields in the web page by parsing the web page to reveal the set of form fields;
  identifying a set of information for a form field in the set of form fields if the form field is not a protected form field, wherein identifying a protected form field includes determining whether the form field is in a protected list and determining whether a field type for the form field is one of, password, hidden, button, image, read-only, or disabled, where protected form fields include fields that are not to be included in a template based on a security policy;
  creating a template for the at least one form from the web page using the set of information by aggregating the set of information for the form field with information for the set of form fields in the web page into the template; and
  storing the template in a data structure associated with the web page;
  applying one or more field-type specific visual effects to the set of form fields to be filled on a display screen, where the specific visual effects are determined, at least in part, by field-types of the set of form fields to be filled; and
  providing the template to a form fill process to cause the template to be automatically filled on a subsequent visit to the web page.

6. The non-transitory computer-readable medium of claim 5, where the set of information includes a field type, a field identifier, a field pointer, a field value that is populated from a user input, and a field label, and where the at least one form is defined in a Document Object Model (DOM) associated with the web page.

7. The non-transitory computer-readable medium of claim 6, where identifying the set of information includes identifying the field label by:
  determining whether the field identifier is associated with an HTML label tag with an attribute set to the field identifier and using the value of an innerText attribute of the HTML label tag as the field label; and
  searching proximate to the form field for text that identifies the field label upon determining that the field identifier is not associated with an HTML label tag.

8. The non-transitory computer-readable medium of claim 5, where the analyzing includes analyzing a set of frames in the web page.

9. The non-transitory computer-readable medium of claim 5, where identifying a field value for the form field includes using an access method associated with the field type for the form field, where:
  identifying the field value for a text box field type includes reading a value attribute of the text box,
  identifying the field value for a text area field type includes reading a value attribute of the text area,
  identifying the field value for a radio button field type includes:
    enumerating a set of options for the radio button field type,
    determining a value that is selected from the set of options,
  identifying the field value for a check box field type includes:
    determining a field value of a checked attribute,
  identifying the field value for a select field type includes:
    determining a mode for the select field type, the mode being one of a multi-mode and a single mode, and
    returning a field value of the select field type from an associated data structure.

10. The non-transitory computer-readable medium of claim 5, comprising:
  applying one or more specific visual effects for a field type to the form field to be filled on a display screen, where the specific visual effects are determined, at least in part, by a field-type of a form field to be filled.

* * * * *

UNITED STATES PATENT AND TRADEMARK OFFICE
CERTIFICATE OF CORRECTION

PATENT NO. : 9,842,097 B2
APPLICATION NO. : 11/980153
DATED : December 12, 2017
INVENTOR(S) : Selig Page 1 of 1

It is certified that error appears in the above-identified patent and that said Letters Patent is hereby corrected as shown below:

In the Specification

In Column 4, Line 31, delete "servelet," and insert -- servlet, --, therefor.

Signed and Sealed this
Fourth Day of June, 2019

Andrei Iancu
*Director of the United States Patent and Trademark Office*